(12) United States Patent
Ramakrishnappa et al.

(10) Patent No.: US 10,713,127 B2
(45) Date of Patent: Jul. 14, 2020

(54) SYSTEM AND METHOD FOR ESTABLISHING AN ALTERNATE COMMUNICATION PATH BETWEEN A CENTRAL MONITORING STATION AND A CONNECTED SECURITY/CONTROL SYSTEM

(71) Applicant: Ademco Inc., Golden Valley, MN (US)

(72) Inventors: Harish M. Ramakrishnappa, Bangalore (IN); Ravikumar Vemagal Aswath, Bangalore (IN); Shankar Prasad, Bangalore (IN)

(73) Assignee: ADEMCO INC., Golden Valley, MN (US)

( * ) Notice: Subject to any disclaimer, the term of this patent is extended or adjusted under 35 U.S.C. 154(b) by 209 days.

(21) Appl. No.: 15/654,403

(22) Filed: Jul. 19, 2017

(65) Prior Publication Data

US 2019/0026199 A1    Jan. 24, 2019

(51) Int. Cl.
*G06F 11/00* (2006.01)
*G06F 11/20* (2006.01)
(Continued)

(52) U.S. Cl.
CPC ...... *G06F 11/2002* (2013.01); *G06F 11/1464* (2013.01); *G08B 25/004* (2013.01);
(Continued)

(58) Field of Classification Search
CPC .. G06F 11/2002; G06F 11/1464; G06F 11/14; G06F 11/20
See application file for complete search history.

(56) References Cited

U.S. PATENT DOCUMENTS 7,542,721 B1   6/2009 Bonner et al.
8,385,511 B2   2/2013 Glass et al.
(Continued)

FOREIGN PATENT DOCUMENTS

CA   2581056 A1   9/2007
JP   2009187428 A   8/2009
(Continued)

OTHER PUBLICATIONS

Extended European search report for corresponding EP patent application 18177394.6, dated Sep. 20, 2018.

*Primary Examiner* — Katherine Lin
(74) *Attorney, Agent, or Firm* — Husch Blackwell LLP

(57) ABSTRACT

A system and method (10) are disclosed for providing an alternate communication path (30) between a central monitoring station (12) and a connected security/control system (14) for a home, office, apartment, business, or other resident or work-related area (16), the system (14) having a control panel (18) and a plurality of connected electronic devices (22 and 24), each device (22, 24) having a signal connection (26) with the control panel (18) to enable the control panel (18) to monitor and/or control each of the electronic devices (22 and 24). The system (10) is configured to automatically detect a failure in a primary communication path (20) between the control panel (18) and the central monitoring station (12) and, in response to such a detected failure, to automatically establish an alternative communication path (30) via one or more of the connected electronic devices (24).

14 Claims, 4 Drawing Sheets

(51) Int. Cl.
 G08B 25/00 (2006.01)
 G06F 11/14 (2006.01)
 H04L 12/707 (2013.01)
 G08B 25/10 (2006.01)
 G08B 25/08 (2006.01)

(52) U.S. Cl.
 CPC .............. H04L 45/22 (2013.01); *G06F 11/14* (2013.01); *G06F 11/20* (2013.01); *G08B 25/08* (2013.01); *G08B 25/10* (2013.01)

(56) References Cited

U.S. PATENT DOCUMENTS

| | | | |
|---|---|---|---|
| 2003/0142794 | A1 | 7/2003 | Giacopelli et al. |
| 2006/0034255 | A1 | 2/2006 | Benning et al. |
| 2010/0283612 | A1* | 11/2010 | Wong ................. G08B 13/1409 340/568.1 |
| 2013/0321150 | A1 | 12/2013 | Koenig et al. |
| 2014/0266674 | A1* | 9/2014 | Nye ....................... G08B 29/06 340/507 |
| 2015/0161880 | A1* | 6/2015 | Hwang ............. H04M 3/42042 340/508 |
| 2016/0026773 | A1 | 1/2016 | Chu et al. |

FOREIGN PATENT DOCUMENTS

| | | |
|---|---|---|
| WO | 2009006670 A1 | 1/2009 |
| WO | 2015017918 A1 | 2/2015 |

\* cited by examiner

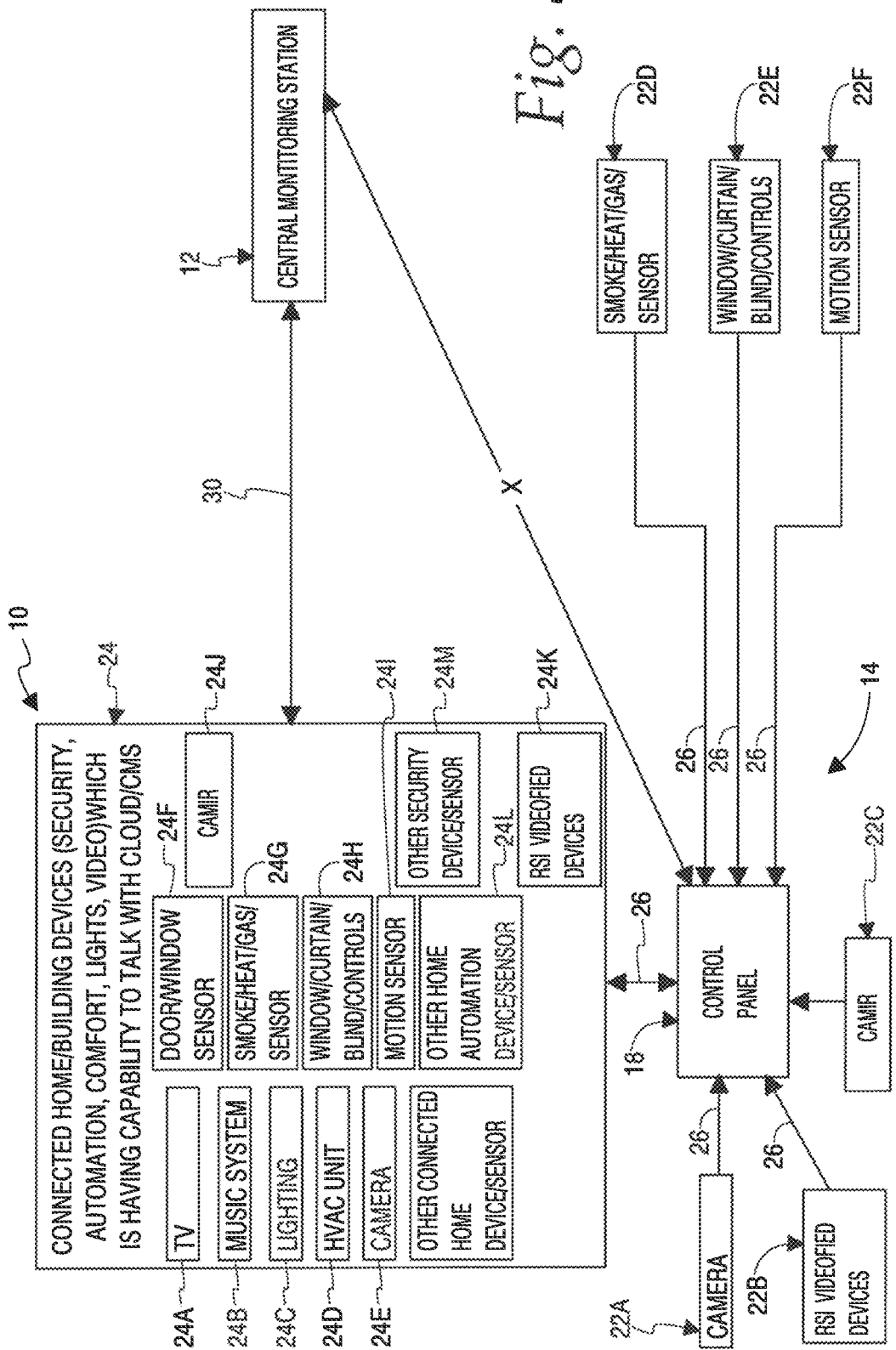

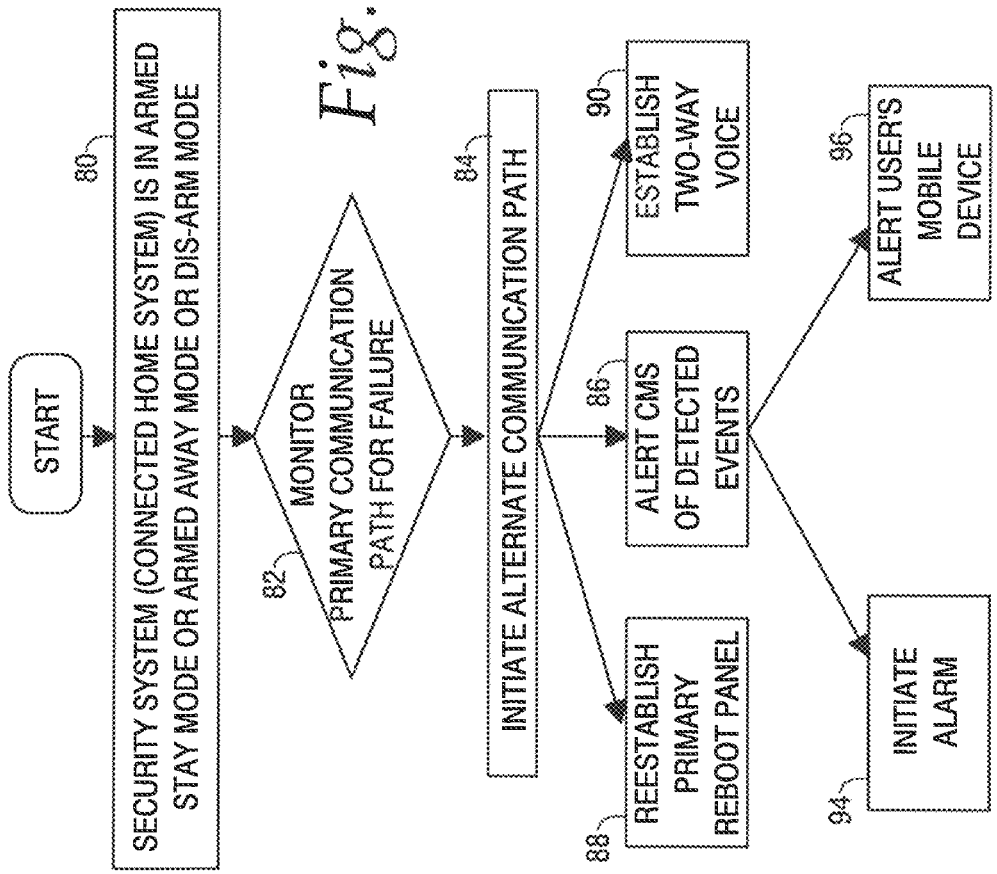
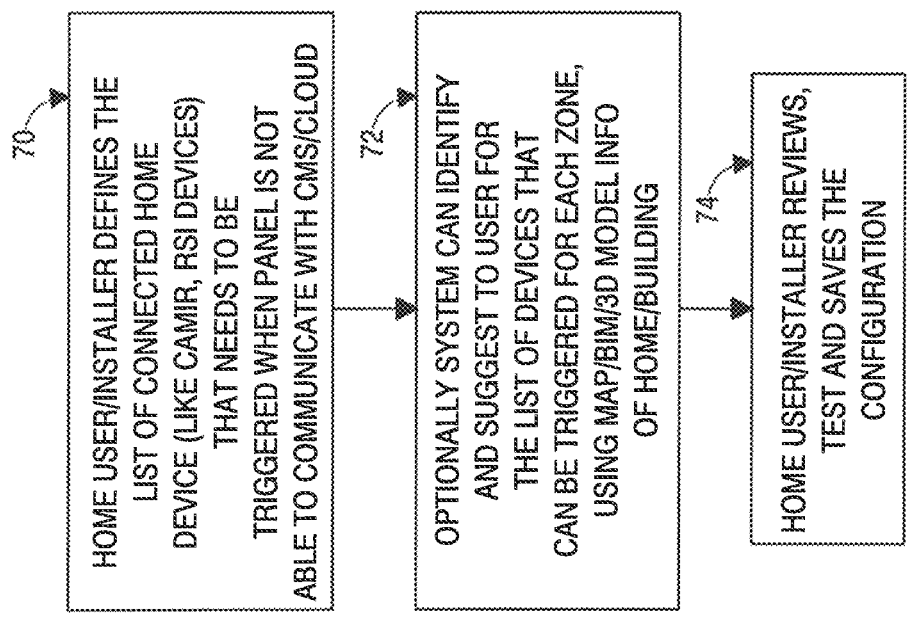

SYSTEM AND METHOD FOR ESTABLISHING AN ALTERNATE COMMUNICATION PATH BETWEEN A CENTRAL MONITORING STATION AND A CONNECTED SECURITY/CONTROL SYSTEM

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD

This disclosure relates to connected security/control systems for use in homes, offices, apartments, businesses, and residential and work related areas to monitor and/or control electronic devices, such as, for example: door and window sensors; smoke or gas sensors/detectors; video cameras; door locks; thermostats; heating/vending/air conditioning (HVAC) systems; lights; TVs; sound systems; automated windows, doors, shades, blinds, and curtains; and other electronic devices that serve to enhance the safety and/or use of an area protected/controlled by the connected security/control system.

BACKGROUND

Connected security/control systems for businesses, homes, buildings, apartments, and other protected areas are typically in communication with a central monitoring station that is located remote from the connected security/control system and that functions to monitor events associated with the electronic devices controlled/monitored by the connected security/control system, particularly, events associated with the connected security and safety devices of the connected security/control system, Typically, the communication is between the central monitoring station and a control panel of a connected security/control system and via a communication path that can be a wireless signal connection, a hard-wired signal connection, or combination of wireless and hard-wired signal connections, Problems can occur when communication is lost between the control panel and the central monitoring station, which can occur when there are issues with the communication path, such as, for example, when there are issues with any wireless signal network, and/or hard-line network that forms part of the communication path, when the firmware of the control panel crashes, when the control panel has been tampered with by an intruder, and/or when there is a power loss to the control panel. When this occurs, the control panel is not able to alert the central monitoring station of any events, including any alarms, that occur in the connected security/control system, the central monitoring station is not able to establish a two-way voice communication that is protected/controlled by the connected security/control system, the control panel may be unable to initiate any connected alarm devices in response to a connected sensor indicating that such alarm devices should be initiated, and a technician may have to be sent to the site in order to fix any issues associated with the control panel and the communication path, with an associated delay in the functionality of the connected security/control system.

SUMMARY

In accordance with one feature of this disclosure, a method is disclosed for providing an alternate communication path between a central monitoring station and a connected security system including a control panel communicating with the central monitoring station via a primary communication path, and a plurality of connected electronic devices each a having signal connection with the control panel to enable the control panel to monitor and/or control each of the electronic devices to serve an area protected by the security system. The method includes the steps of:

a) automatically detecting a failure in the primary communication path between the control panel and the central monitoring station; and b) in response to step a), automatically establishing an alternate communication path between at least one of the connected electronic devices and the central monitoring station, the alternate communication path bypassing the control panel.

In one feature, the at least one of the connected electronic devices is an electronic device comprising a camera monitoring any portion of the area protected by the security system.

According to one feature, the method further includes the step of transmitting a signal from the at least one of the connected electronic devices to the central monitoring station via the alternate communication path alerting the central monitoring station of an event detected by one of the connected electronic devices.

In one feature, the event is the activation of an alarm.

According to one feature, the method further includes transmitting a signal from the central monitoring station to the at least one of the connected electronic devices via the alternate communication path and retransmitting the signal from the at least one of the connected electronic devices to the control panel.

As one feature, the method further includes transmitting a signal from the control panel to the at least one of the connected electronic devices and retransmitting the signal from the at least one of the connected electronic devices to the central monitoring station via the alternate communication path.

In one feature, the method further includes transmitting signals between the control panel and the central monitoring station via the alternate communication path and the at least one of the connected electronic devices.

According to one feature, the method further includes establishing a two-way-voice capability between the control panel and the central monitoring station via the alternate communication path and the at least one of the connected electronic devices.

According to one feature, the step of establishing an alternate communication path comprises establishing a wireless signal connection.

As one feature, the primary communication path includes a wireless signal connection.

In one feature, the method further includes establishing a communication path between the at least one of the connected electronic devices and another one of connected electronic devices and transmitting a signal from the at least on the connected electronic devices and the another one of the connected electronic devices.

According to one feature, the method further includes the steps of:

establishing a communication path between the at least one of the connected electronic devices and a connected alarm device; and in response to a signal indicating an alarm event detected by one of the connected electronic devices, transmitting a command signal from the at least one of the connected electronic devices to the alarm device via the communication path to command the alarm device to initiate an alarm. In a further feature, the step of establishing a communication path includes establishing a wireless connection.

In one feature, the method further includes transmitting a signal from the at least one of the connected electronic devices to the control panel commanding the control panel to attempt to reestablish the primary communication path.

According to one feature, the method further includes transmitting a signal from the at least one of the connected electronic devices to the control panel commanding the control panel to attempt to reboot.

It should be appreciated that this disclosure contemplates the combination of any one or all of the above features.

Other features and advantages will become apparent from a review of the entire specification, including the appended claims and drawings.

BRIEF DESCRIPTION OF THE DRAWINGS

FIG. 3 is block diagram illustration of the system according to this disclosure showing more of the connected electronic devices of the system; and FIG. 4 is a block diagram illustrating one procedure for setting up the system of FIGS. 1-3; and FIG. 5 is a block diagram better illustrating an embodiment of the method according to this disclosure.

DETAILED DESCRIPTION

Figure 1:
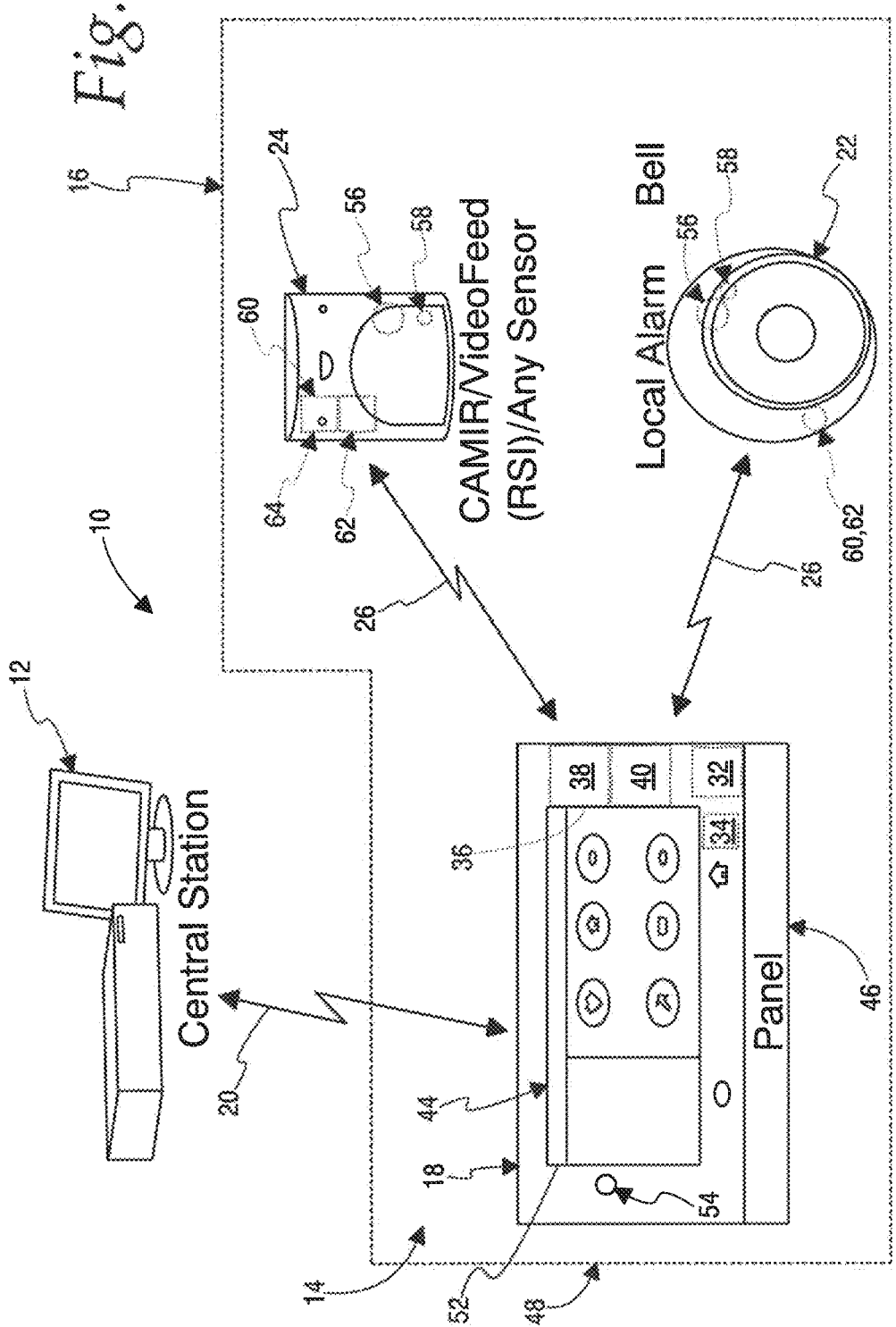
FIG. 1 is a diagrammatic representation of a system and method according to this disclosure for providing an alternate communication path in response to a failure in a primary communication path between a central monitoring station and a connected security/control system for a home, office, apartment, business, or other resident or work-related area, with the system operating in a "normal" mode with the primary communication path established between the control panel of the security system and the central monitoring station.

A system and method 10 for providing an alternate communication path between a central monitoring station 12 (CMS12) and a connected security/control system 14 for a home, office, apartment, business, or other resident or work-related area, shown at 16 are diagrammatically illustrated in FIG. 1. The connected security/control system 14 includes a control panel 18 that communicates with the central monitoring station 12 via a primary communication path 20. The primary communication path 20 can be via a wireless signal connection/network, a hard-wired signal connection/network, or a combination of wired and wireless signal connections/networks. In the illustrated embodiment, the connected security/control system 14 further includes a plurality of connected electronic devices 22 and 24 (only one of each shown in FIG. 1 for purposes of illustration), each device 22, 24 having a signal connection 26 with the control panel 18 to enable the control panel 16 to monitor and/or control each of the electronic devices 22 and 24 to serve the area 16 protected/controlled by the security/control system 14. Typically, each signal connection 26 is a wireless signal connection using any suitable wireless protocol, many of which are known, including for example: Z-wave wireless protocols, Bluetooth protocols and the ISM band from 2400 to 2800 megahertz, ZigBee protocols such as IEEE 802.15.4, ultra-wide band protocols such as IEEE 802.14.4a, Wi-Fi or local area network protocols, such as IEEE 802.11, GSM protocol, MUTTS protocol, or CDMA protocol.

Figure 2:
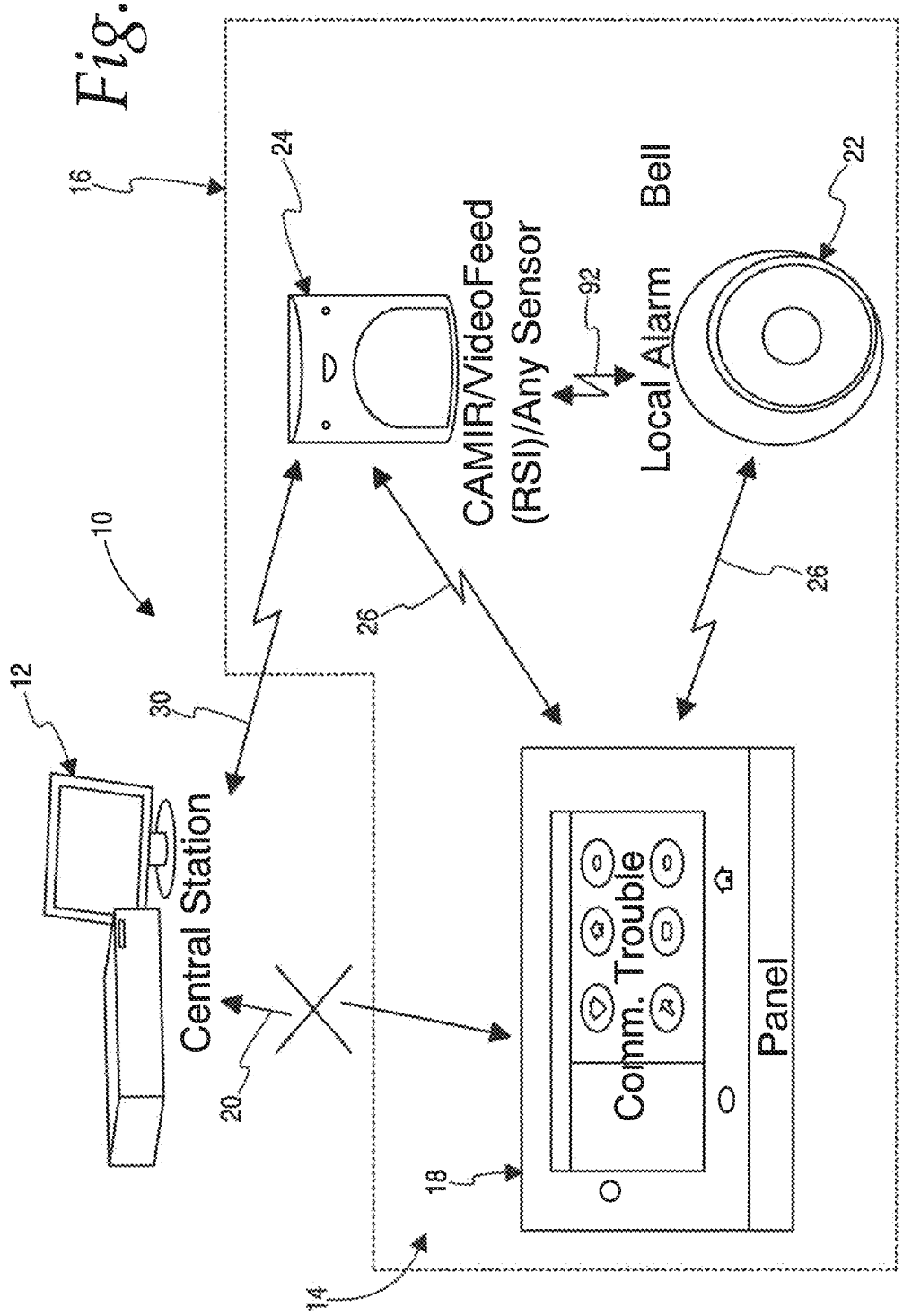
FIG. 2 is a view similar to FIG. 1, but showing the system responding to a failure in the primary communication path by establishing an alternate communication path between the central monitoring station and a connected electronic device of the security/control system.

With reference to FIG. 2, the system and method 10 is configured to automatically detect a failure in the primary communication path 20 and, in response to such a detected failure, to automatically establish an alternative communication path 30 via one or more of the connected electronic devices 24, as will be explained in more detail below. It should be appreciated that the failure in the primary communication path 20 can occur for a number of reasons, including, for example, issues with any wireless signal network and/or hard-line network that forms part of the primary communication path 20, a crash in the firmware or software utilized in the control panel 18, tampering with the control panel 18, such as by an intruder, and/or a power loss to the control panel 18. In the illustrated embodiment, the capability of the system 10 to detect a failure in the primary communication path 20 can include a determination by the control panel 18 that there has been a failure in the primary communication path 20, with a signal being provided from the control panel 18 to one or more of the electronic devices 24 via the signal connections 26 indicating that there has been a failure in the primary communication path 20. In response to this signal, each of the electronic devices 24 has the capability to automatically establish an alternate communication path 30 between the connected electronic device 24 and the central monitoring station 12, as shown in FIG. 2. Alternatively, or in addition, each of the electronic devices 24 can be configured to detect a failure in the primary communication path 20 and, in response to such a detection, to automatically establish the alternate communication path 30.

With reference to FIG. 1, the control panel 18 typically includes: a processor 32; a memory 34; a communication device 36, typically including a transceiver 38 for sending and receiving wireless signals and modem/ethernet card/network adapter 40 for hard-wired signal connections; a user output device 42, typically in the form of a user display 44 and a speaker 46; and a user input device 48, typically in the form of a keypad or touchscreen 52, and microphone 54. The processor 32 is operably connected to each of the components 34-54 to communicate with and control each of the components 34-54. Furthermore, the processor 32 is configured to detect a failure in the primary communication path 20, including a failure for any of the potential causes discussed above, and to command the communication device 36 to transmit a signal to one or more of the electronic devices 24 via the signal connections 26 indicating that a failure of the primary communication path 20 has been detected.

Again with reference to FIG. 1, typically, each of the connected electronic devices 24 will also include a processor 56, a memory 58, and a communication device 60, that will typically include a transceiver 62 for sending and receiving wireless signals and may also include a modem/ethernet card/network adapter 64 for a hard-wire signal connection. The processor 56 is operably connected to each of the components 58-64 to communicate with and control each of the components 58-64. Furthermore, the processor 56 can be configured to maintain a supervision with the control panel 18 via the signal connection 26 and to detect a break in the supervision indicative of a failure in the primary communication path 20, for any of the reasons discussed above, and in response to such a detection, to automatically command the communication device 60 to establish the secondary communication path 30 with the central monitoring station 12.

With reference to FIG. 3, in the illustrated embodiment, the connected electronic devices 22 include a camera 22A, a Videofide (RSI) device 22B, a combined infrared motion sensor and camera (CAMIR) 22C, a smoke/heat/gas sensor 22D, a door/window sensor 22E, and a motion sensor 22F. The connected electronic devices 24 of the embodiment illustrated in FIG. 3 include a TV 24A, a music system 24B, lighting 24C, an HVAC unit 24D, a camera 24E, door/window sensor 24F, a smoke/heat/gas sensor 24G, automated window/curtain/blind controls 24H, motion sensors 24I, a combined infrared motion sensor and camera (CAMIR) 24J, a Videofide (RSI) device 24K, other connected home devices and sensors 24L, and other connected security devices and sensors 24M. It should be noted that only one of the signal connections 26 is shown in FIG. 3 for all of the devices 24 for purposes of illustration, but it should be understood that each of the devices 24 will have its own signal connection 26 with the control panel 18. In FIG. 1, the electronic device 24 is shown in the form of a combined infrared motion sensor and camera (CAMIR) and the connected electronic device 22 is shown in the form of a local alarm device 22.

Either during original installation, or after installation of the security/control system 14, an installer can utilize the user input device 48 of the control panel 18 to program/define which of the electronic devices 24 should be triggered to initiate the secondary communication path 30 when a failure in the primary communication path 20 has been detected, as shown at 70 in FIG. 4. Furthermore, the system 10 can be configured to automatically suggest to an installer which of the devices 24 are to be triggered dependent upon the location of each device 24 within the protected/controlled area 16, as shown at 72. After the system 10 is configured, the Installer can save and test the configuration to ensure it is operating as intended, as shown at 74 in FIG. 4.

In operation, the system 10 is activated/armed, such as being armed in a stay mode or armed in an away mode, as shown at 80 in FIG. 5, and the processor 32 of the panel 18 and/or one or more of the processors 56 of the connected electronic devices 24 monitor for a failure in the primary communication path 20, as shown at 82 in FIG. 5. If such a failure is detected, one or more of the connected electronic devices 24 will attempt to initiate an alternate communication path 30 with the central monitoring station 12, as shown at 84 in FIG. 5. In this regard, any suitable protocol or combination of protocols, many of which are known, can be utilized for establishing the alternate communication path 30, such as, for example, any suitable wireless signal protocol for establishing a wireless signal connection and/or any suitable ethernet protocol for establishing an ethernet connection and/or a combination of wireless protocols and ethernet protocols. Once the alternate communication path 30 is established, the system 10 is configured to automatically transmit a signal from one or more of the connected electronic devices 24 to the central monitoring station 12 via the alternate communication path 30 altering the central monitoring station 12 of any events detected by the electronic devices 22 and 24 and/or the control panel 18, as shown at 86 in FIG. 5. In this regard, it is particularly critical for the system 10 to transmit a signal via the alternate communication path 30 alerting the central monitoring station 12 of an alarm event, such as the activation of an alarm associated with one or more of the electronic devices 22 and 24 or the detection of an event by one of the electronic devices 22 and 24 that should cause the activation of an alarm device. Additionally, the system 10 is also configured to automatically transmit a signal from the central monitoring station 12 to one or more of the electronic devices 24 via the alternate communication path 30 which is then retransmitted by the one or more electronic devices 24 to the control panel 18 via the corresponding signal connection 26. In this regard, as shown at 88 in FIG. 5, the system 10 is configured so that the central monitoring station 12 will send a signal to one or more of the devices 24 via the secondary communication path 30 which causes the one or more connected electronic devices 24 to send a signal to the control panel 18 via the signal connection(s) 26 commanding the control panel 18 to:

(a) reestablish the primary communication path; and/or
(b) reboot the control panel 18.

Furthermore, the system 10 is configured to attempt to automatically establish a two-way voice capability between the control panel 18 and the central monitoring station 12 via the alternate communication path 30 by sending two-way voice signals via the alternate communication path 30 and the corresponding signal connections 26, as shown at 90 in FIG. 5. In this regard, voice signals are transmitted from the central monitoring station 12 to one or more of the connected devices 24 via the alternate communication path 30 and then retransmitted from the one or more connected electronic devices 24 to the control panel 18 via the corresponding signal connection 26, In the opposite direction, voice signals from the control panel 18 are transmitted to the one or more connected electronic devices 24 via the corresponding signal connections 26 and then retransmitted from the one or more connected electronic devices 24 to the central monitoring station 12 via the alternate communication path 30.

The system 10 is also configured such that a signal communication path 92 (shown in FIG. 2) can be established between one or more of the connected electronic devices 24 and one or more of the connected electronic devices 22, and in response to a signal indicating an alarm event has been detected by another of the connected electronic devices 22, 24, to automatically transmit a command signal from the one or more connected electronic devices 24 to a connected alarm device 22 via the signal communication path 92 to command the alarm device 22 to initiate an alarm, as shown at 94 in FIG. 5. Further in this regard, the system 10 can be configured such that the central monitoring station 12 can command one of the electronic devices 24 to send a signal via the connection 92 to an alarm device 22 causing the alarm device 22 to initiate an alarm. Additionally, as shown at 96 in FIG. 5, the system 10 can be configured to also transmit a signal to a user's portable handheld electronic device, such as a smartphone, in order to alert the user of the alarm event.

The system 10 can optionally be configured such that it will only attempt to establish the secondary communication path 30 in the event that one of the electronic devices 22 or 24 have experienced an event that should be passed along to the central monitoring station 12, such as one of the electronic devices 22 and/or 24 detecting an event that should trigger an alarm.

It should be understood that while this disclosure illustrates and describes specific embodiments of the features disclosed herein, this disclosure contemplates embodiments not expressly described in the application. For example, while specific connected electronic devices 22 and 24 are shown in FIG. 3, other connected electronic devices, many of which are known, can be configured and utilized in the system 10. Similarly, while a combined infrared motion sensor and camera 24 is shown in FIGS. 1 and 2 as the connected electronic device 24 that establishes the alternate communication path 30, any suitable connected electronic device 24 having the appropriate communication device 60 can be utilized, including any of those described and shown in FIG. 3. By way of further example, while specific forms of the central monitoring station 12 and control panel 18 are shown in FIGS. 1 and 2, many suitable forms and configurations are known, and any can be configured according to this disclosure.

It should be appreciated that by providing a system and method 10 that can automatically establish an alternate communication path 30 when problems occur in the primary communication path 20, the disclosed system and method 10 provide superior protection, control, and monitoring in comparison to conventional, commercially available connected security/control systems.

As used herein, the term "processor" is intended to include any logic circuitry that responds to and processes the basic instructions/algorithms and logic operations to monitor and control other electronic devices and can be of any suitable design and configuration, many of which are known, including, for example, microprocessors. The term "memory" can include any device, or combination of devices, capable of storing data/information and being automatically accessed by a computer processor that is in communication therewith.

The invention claimed is:

1. A method of providing an alternate communication path between a central monitoring station and a connected security system, the method comprising the steps of:
    establishing, by a control panel of the connected security system, a primary communication path directly between the control panel and the central monitoring station;
    communicating between the control panel and the central monitoring station via the primary communication path;
    monitoring and/or controlling, by the control panel, a plurality of connected electronic devices that fail to include the control panel via a signal connection between the plurality of connected electronic devices and the control panel;
    automatically detecting, by the control panel or any of the plurality of connected electronic devices, a failure in the primary communication path;
    responsive to detecting the failure in the primary communication path, automatically establishing, by a predefined one of the plurality of connected electronic devices, the alternate communication path between the predefined one of the plurality of connected electronic devices and the central monitoring station such that the alternate communication path bypasses the control panel;
    detecting a first event at a first of the plurality of connected electronic devices during the failure in the primary communication path; and
    transmitting a first signal from the predefined one of the plurality of connected electronic devices to the central monitoring station via the alternate communication path, the first signal alerting the central monitoring station of the first event detected.

2. The method of claim 1 wherein the first event is an activation of an alarm.

3. The method of claim 1 further comprising:
    receiving a second signal from the central monitoring station at the predefined one of the plurality of connected electronic devices via the alternate communication path; and
    retransmitting the second signal from the predefined one of the plurality of connected electronic devices to the control panel.

4. The method of claim 1 further comprising:
    transmitting a second signal from the control panel to the predefined one of the plurality of connected electronic devices; and
    retransmitting the second signal from the predefined one of the plurality of connected electronic devices to the central monitoring station via the alternate communication path.

5. The method of claim 1 further comprising:
    establishing a two-way-voice capability between the control panel and the central monitoring station via the alternate communication path.

6. The method of claim 1 further comprising:
    transmitting a second signal to the central monitoring station via the alternate communication path, the second signal informing the central monitoring station of any failure associated with the control panel.

7. The method of claim 1 wherein the alternate communication path includes a wireless signal connection.

8. The method of claim 1 wherein the primary communication path includes a wireless signal connection.

9. The method of claim 1 further comprising:
    establishing a first communication path between the predefined one of the plurality of connected electronic devices and the first of the plurality of connected electronic devices; and
    receiving a notification of the first event at the predefined one of the plurality of connected electronic devices directly from the first of the plurality of connected electronic devices via the first communication path.

10. The method of claim 1 further comprising:
    establishing a first communication path between the predefined one of the plurality of connected electronic devices and an alarm device; and
    responsive to an alarm signal indicating an alarm event detected by any of the plurality of connected electronic devices, transmitting a command signal from the predefined one of the plurality of connected electronic devices to the alarm device via the first communication path to instruct the alarm device to initiate an alarm.

11. The method of claim 10 wherein the first communication path includes a wireless connection.

12. The method of claim 1 further comprising:
    transmitting a second signal from the predefined one of the plurality of connected electronic devices to the control panel, the second signal instructing the control panel to attempt to reestablish the primary communication path.

13. The method of claim 1 further comprising:
transmitting a second signal from the predefined one of the plurality of connected electronic devices to the control panel, the second signal instructing the control panel to attempt to reboot.

14. The method of claim 1 wherein the predefined one of the plurality of connected electronic devices includes a camera monitoring a portion of an area protected by the connected security system.

* * * * *